US010674257B1

(12) United States Patent
Zhong et al.

(10) Patent No.: US 10,674,257 B1
(45) Date of Patent: Jun. 2, 2020

(54) WEARABLE DEVICE WITH BONE CONDUCTION MICROPHONE

(71) Applicant: AMAZON TECHNOLOGIES, INC., Seattle, WA (US)

(72) Inventors: Xuan Zhong, Mountain View, CA (US); Jung Sik Yang, Santa Clara, CA (US); Jianchun Dong, Sunnyvale, CA (US); Chia-Jean Wang, Palo Alto, CA (US); Oliver Huy Doan, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/084,422

(22) Filed: Mar. 29, 2016

(51) Int. Cl.

| | |
|---|---|
| ***G02C 1/00*** | (2006.01) |
| ***H04R 1/46*** | (2006.01) |
| ***H04R 17/02*** | (2006.01) |
| ***H04R 1/02*** | (2006.01) |

(52) U.S. Cl.
CPC ............... *H04R 1/46* (2013.01); *H04R 1/028* (2013.01); *H04R 17/02* (2013.01); *H04R 2460/13* (2013.01)

(58) Field of Classification Search
CPC .......... G02C 11/10; G02C 11/06; G02C 5/12; G02C 11/08
USPC .......................................... 351/158, 41, 136
See application file for complete search history.

(56) References Cited

U.S. PATENT DOCUMENTS

| | | | |
|---|---|---|---|
| 2,962,562 | A | 11/1960 | Viccarrell |
| 4,520,238 | A | 5/1985 | Ikeda |
| 4,654,883 | A | 3/1987 | Iwata |
| 5,151,944 | A | 9/1992 | Yamamura |
| 9,482,882 | B1 | 11/2016 | Hanover et al. |
| 2004/0157649 | A1 | 8/2004 | Jannard et al. |
| 2006/0132382 | A1 | 6/2006 | Jannard |
| 2010/0110368 | A1 | 5/2010 | Chaum |
| 2011/0139163 | A1* | 6/2011 | Hillila .................... A61H 23/00 128/861 |
| 2011/0224481 | A1 | 9/2011 | Lee et al. |

(Continued)

FOREIGN PATENT DOCUMENTS

| | | |
|---|---|---|
| EP | 0109646 | 5/1984 |
| WO | WO2015109810 | 7/2015 |

OTHER PUBLICATIONS

Hakansson, Bo E.V., "The balanced electromagnetic separation transducer: A new bone conduction transducer", Department of Signals and Systems, Chalmers University of Technology, S-412 96 Goteborg, Sweden. J. Acoust. Soc. Am. 113 (2), Feb. 2003. Retrieved from the Internet <URL: http://www.ortofon.com/media/15442/baha_the_balanced_electromagnetic_separation_transducer.pdf>.

(Continued)

*Primary Examiner* — Hung X Dang
(74) *Attorney, Agent, or Firm* — Lindauer Law, PLLC

(57) ABSTRACT

A head-mounted wearable device incorporates a transducer into a nosepiece. Vibrations from the user's speech are transferred through the bridge of the nose and are detected by the transducer to produce an audio signal. In one implementation, a nose plate with a pair of attached nosepieces is mounted to a transducer, such as an accelerometer. The nose plate may be affixed to a front frame of the head-mounted wearable device using a motion limiter mechanism.

21 Claims, 9 Drawing Sheets

(56) References Cited

U.S. PATENT DOCUMENTS

| | | | | |
|---|---|---|---|---|
| 2012/0194419 | A1* | 8/2012 | Osterhout .......... | G02B 27/0093 345/156 |
| 2012/0289162 | A1 | 11/2012 | Hosoi et al. | |
| 2013/0329918 | A1 | 12/2013 | Kubba | |
| 2015/0230033 | A1 | 8/2015 | Sprague et al. | |
| 2015/0341717 | A1 | 11/2015 | Song et al. | |
| 2015/0365754 | A1 | 12/2015 | Perl | |
| 2016/0246059 | A1 | 8/2016 | Halpin et al. | |
| 2018/0035219 | A1 | 2/2018 | Gustafsson | |

OTHER PUBLICATIONS

Knowles Electronics, "Vibration Transducer, Outline Drawing". Retrieved from the Internet <URL: http://www.knowles.com/eng/content/download/3060/35850/version/3/tile/BU-23842-000.pdf>.

Zhang, Leshui, "Final Office Action dated Apr. 25, 2018", U.S. Appl. No. 15/386,164, The United States Patent and Trademark Office, dated Apr. 25, 2018.

Zhang, Leshui, "Non-Final Office Action dated Nov. 3, 2017", U.S. Appl. No. 15/386,164, The United States Patent and Trademark Office, dated Nov. 3, 2017.

Zhang, Leshui, "Non-final Office Action dated Oct. 11, 2018", U.S. Appl. No. 15/386,164, The United States Patent and Trademark Office, dated Oct. 11, 2018.

Zhang, Leshui , "Final Office Action dated May 8, 2019", U.S. Appl. No. 15/386,164, The United States Patent and Trademark Office, dated May 8, 2019.

Zhang, Leshui, "Non-final Office Action dated Oct. 2, 2019", U.S. Appl. No. 15/386,164, The United States Patent and Trademark Office, dated Oct. 2, 2019.

* cited by examiner

WEARABLE DEVICE WITH BONE CONDUCTION MICROPHONE

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
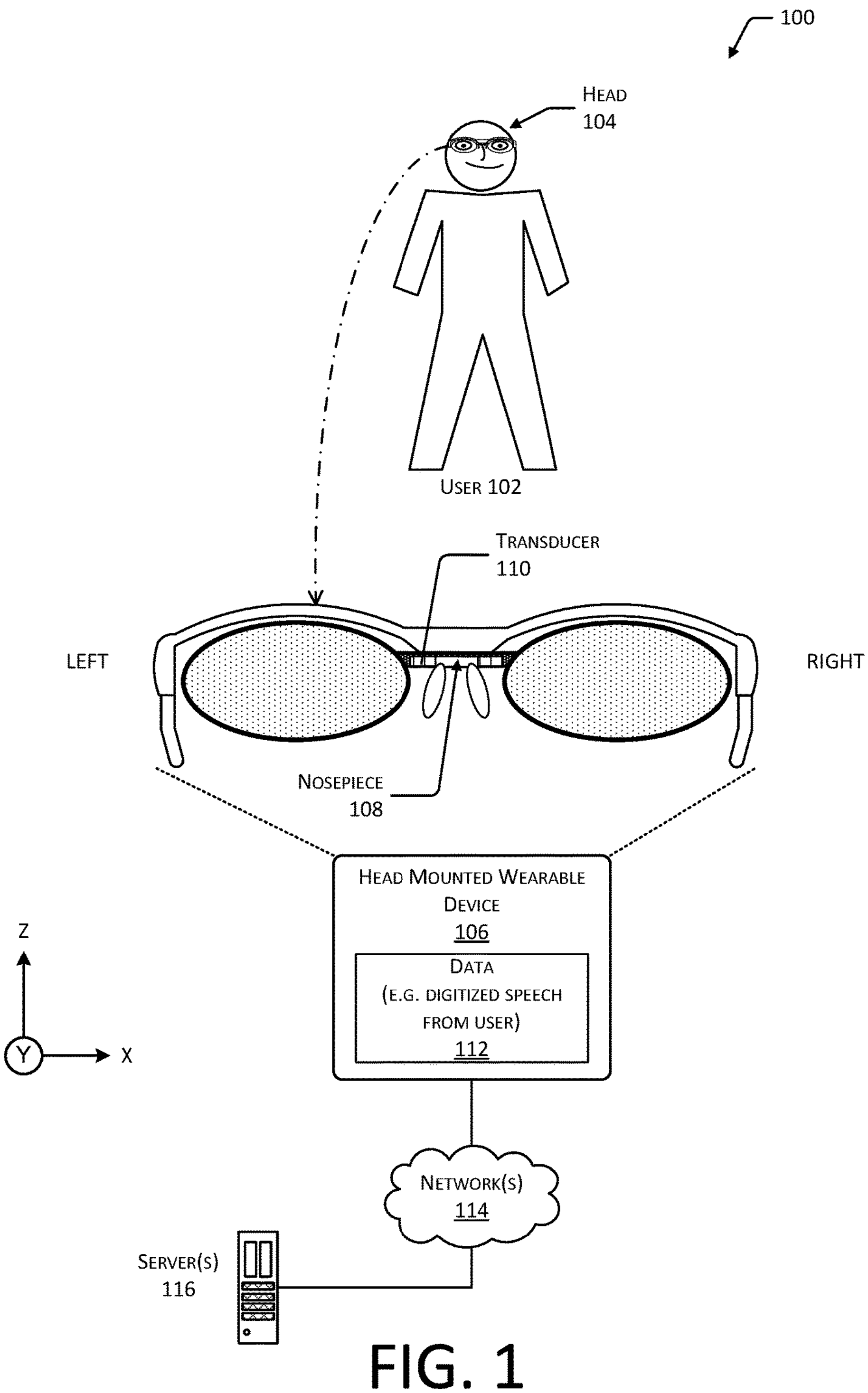
FIG. 1 depicts a system including a head-mounted wearable device including a transducer at the nosepiece acting as a bone conduction microphone and one or more servers, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Wearable devices provide many benefits to users, allowing easier and more convenient access to information and services. For example, a head-mounted wearable device having a form factor similar to eyeglasses may provide a ubiquitous and easily worn device to access information.

Traditional head-mounted wearable devices (HMWDs) have utilized air conduction microphones to obtain information from the user. For example, an air conduction microphone detects sounds in the air as expelled by the wearer during speech. However, the air conduction microphone may also detect other sounds from other sources, such as someone else who is speaking nearby, public address systems, and so forth. These other sounds may interfere with the sounds produced by the wearer.

Described in this disclosure are several implementations of a bone conduction microphone integrated into a HMWD at a nosepiece. The bone conduction microphone may be used to detect vibrations in the bridge of the wearer's nose resulting from speech. The bone conduction microphone may comprise a transducer that generates a signal from these vibrations. This signal may be used as an audio signal, and is representative of the vibrations resulting from speech or other noises made by the wearer. For example, the bone conduction microphone may comprise an accelerometer that is able to detect the vibrations occurring in the bridge of a wearer's nose that result from speech.

The bone conduction microphone, or elements associated with it, may be arranged to be in contact with the skin above a bony or cartilaginous structure. For example, nose pads of the nosepiece may be mechanically coupled to the transducer such that vibrations of the nasal bone, glabella, or other structures upon which the nose pads may rest are transmitted to the transducer.

By using the bone conduction microphone in this arrangement, more reliable contact between the bone conduction microphone and the user may be obtained, wearer comfort may be improved, audio from the wearer may be acquired with less interference from adjacent sound sources, and so forth. As a result, the overall user experience may be improved. For example, by using the system described in this disclosure the user and another person with whom they are in audible communication with, such as a telephone call, may benefit from more intelligible speech and a reduction in noise from the ambient environment.

Illustrative System

FIG. 1 depicts a system 100 in which a user 102 is wearing on their head 104 a HMWD 106 in a general form factor of eyeglasses. The HMWD 106 may incorporate hinges to allow the temples of the eyeglasses to fold. The eyeglasses may include a nosepiece 108 that aids in supporting a front frame of the eyeglasses by resting on or otherwise being supported by the bridge of the nose of the user 102. A transducer 110 may be used in conjunction with the nosepiece 108 to act as a bone conduction microphone or speaker. For example, vibrations from the speech of the user 102 may be transferred via the nosepiece 108 to the transducer 110, and an audio signal may be produced. This audio signal may be subsequently used for issuing commands to a processor of the HMWD 106, communication with an external person or device, and so forth. The output from the transducer 110 may comprise an analog signal or a digital signal. Various arrangements of the nosepiece 108, the transducer 110, and other elements are discussed in more detail below.

The HMWD 106 may exchange data 112 using one or more networks 114 with one or more servers 116. For example, the data 112 may comprise digitized speech of the user 102 as obtained by the transducer 110. The servers 116 may support one or more services. These services may be automated, manual, or a combination of automated and manual processes. In some implementations, the HMWD 106 may communicate with another mobile device. For example, the HMWD 106 may use a personal area network (PAN) such as Bluetooth® to communicate with a smartphone.

The structures depicted in this and the following figures are not necessarily according to scale. Furthermore, the proportionality of one component to another may change with different implementations. In some illustrations the scale of a proportionate size of one structure may be exaggerated with respect to another to facilitate illustration, and not necessarily as a limitation.

Figure 2:
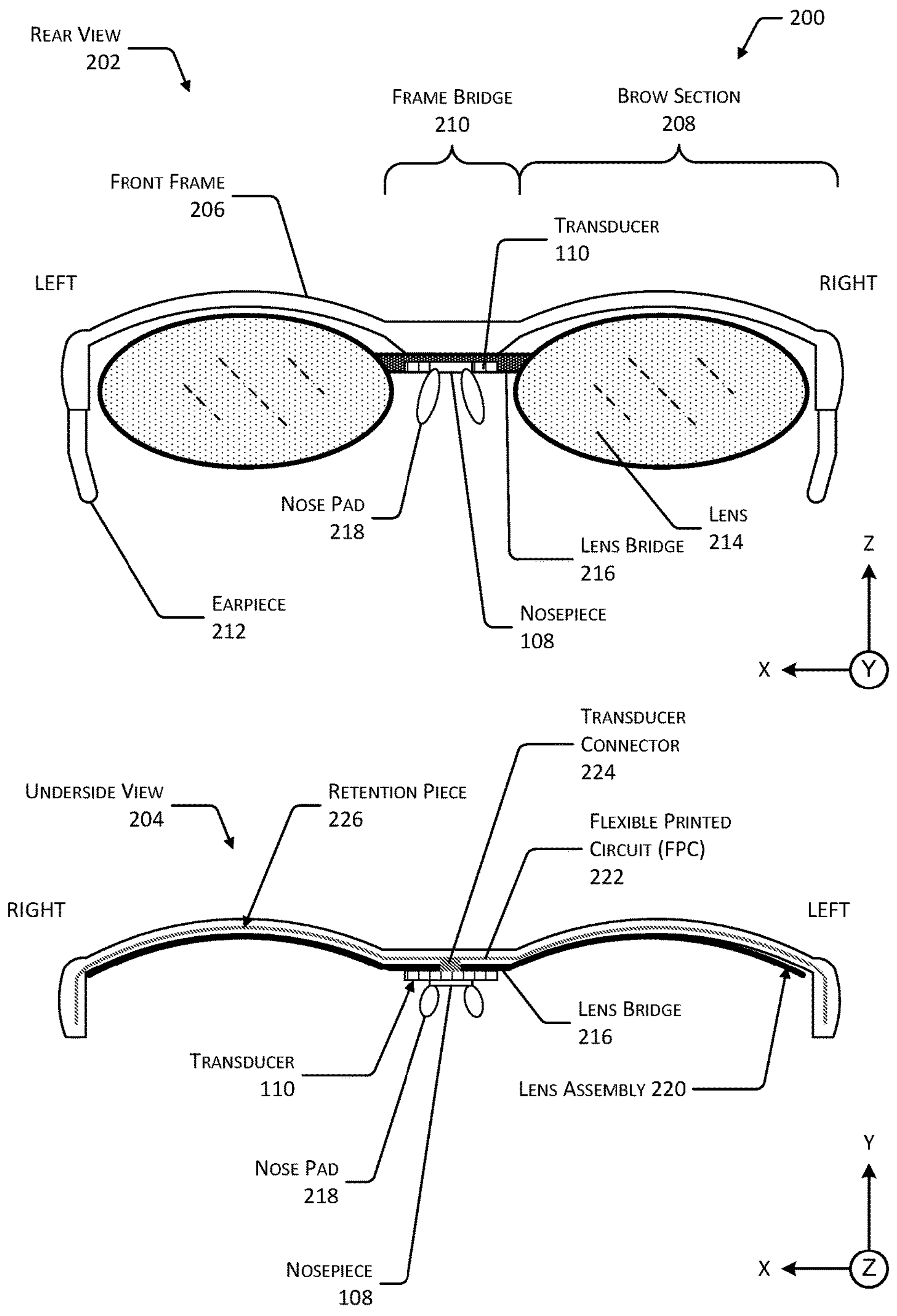
FIG. 2 depicts a rear view and an underside view of the head-mounted wearable device, according to some implementations.

FIG. 2 depicts exterior views 200 of the HMWD 106, according to some implementations. A rear view 202 shows the exterior appearance of the HMWD 106 while an underside view 204 shows selected components of the HMWD 106.

In the rear view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 6061 aluminum alloy that has been milled to the desired shape. In other implementations, the front frame 206 may comprise several discrete pieces that are joined together by way of mechanical engagement features, welding, adhesive, and so forth. Also depicted extending from temples or otherwise hidden from view are earpieces 212.

In some implementations, the HMWD 106 may include one or more lenses 214. The lenses 214 may have specific refractive characteristics, such as in the case of prescription lenses. The lenses 214 may be clear, tinted, photochromic, electrochromic, and so forth. For example, the lenses 214 may comprise plano (non-prescription) tinted lenses to provide protection from the sun. The lenses 214 may be joined to each other or to a portion of the frame bridge 210 by way of a lens bridge 216. The lens bridge 216 may be located between the left lens 214(L) and the right lens 214(R). For example, the lens bridge 216 may comprise a member that joins a left lens 214 and a right lens 214 and affixes to the frame bridge 210. The nosepiece 108 may be affixed to one or more of the front frame 206, the frame bridge 210, the lens bridge 216, or the lenses 214. The transducer 110 may be arranged at a mechanical interface between the nosepiece 108 and the front frame 206, the frame bridge 210, the lens bridge 216, or the lenses 214.

One or more nose pads 218 may be attached to the nosepiece 108. The nose pads 218 aid in the support of the front frame 206 and may improve comfort of the user 102. A lens assembly 220 comprises the lenses 214 and the lens bridge 216. In some implementations, the lens assembly 220 may be omitted from the HMWD 106.

The underside view 204 depicts a front frame 206. One or more electrical conductors, optical fibers, transmission lines, and so forth may be used to connect various components of the HMWD 106. In this illustration, arranged within a channel (not shown, see FIG. 7) is a flexible printed circuit (FPC) 222. The FPC 222 allows for an exchange of signals, power, and so forth between devices in the HMWD 106, such as the transducer 110, the left, and the right side of the front frame 206. For example, the FPC 222 may be used to provide connections for electrical power and data communications between electronics in one or both of the temples and the transducer 110.

In some implementations, the FPC 222 may be substantially planar or flat. The FPC 222 may include one or more of electrical conductors, optical waveguides, radiofrequency waveguides, and so forth. For example, the FPC 222 may include copper traces to convey electrical power or signals, optical fibers to act as optical waveguides and convey light, radiofrequency waveguides to convey radio signals, and so forth. In one implementation, the FPC 222 may comprise a flexible flat cable in which a plurality of conductors is arranged such that they have a substantially linear cross-section overall.

The FPC 222 may be planar in that the FPC 222 has a substantially linear or rectangular cross-section. For example, the electrical conductors or other elements of the FPC 222 may be within a common plane, such as during fabrication, and may be subsequently bent, rolled, or otherwise flexed.

The FPC 222 may comprise one or more conductors placed on an insulator. For example, the FPC 222 may comprise electrically conductive ink that has been printed onto a plastic substrate. Conductors used with the FPC 222 may include, but are not limited to, rolled annealed copper, electro deposited copper, aluminum, carbon, silver ink, austenite nickel-chromium alloy, copper-nickel alloy, and so forth. Insulators may include, but are not limited to, polyimide, polyester, screen printed dielectric, and so forth. In one implementation, the FPC 222 may comprise a plurality of electrical conductors laminated to polyethylene terephthalate film (PET) substrate. In another implementation, the FPC 222 may comprise a plurality of conductors that are lithographically formed onto a polymer film. For example, photolithography may be used to catch or otherwise form copper pathways. In yet another implementation, the FPC 222 may comprise a plurality of conductors that have been printed or otherwise deposited onto a substrate that is substantially flexible.

The FPC 222 may be deemed to be flexible when it is able to withstand one or more of bending around a predefined radius or twisting or torsion at a predefined angle while remaining functional to the intended purpose and without permanent damage. Flexibility may be proportionate to the thickness of the material. For example PET that is less than 250 micrometers thick may be deemed flexible, while the same PET having a thickness of 5 millimeters may be deemed inflexible.

The FPC 222 may include one or more layers of conductors. For example, one layer may comprise copper traces to carry electrical power and signals, a second layer may comprise optical fibers to carry light signals. A transducer connector 224 may provide electrical, optical, radio frequency, acoustic, or other connectivity between the transducer 110 and another device, such as the FPC 222. In some implementations the transducer connector 224 may comprise a section or extension of the FPC 222. In other implementations, the transducer connector 224 may comprise a discrete piece, such as wiring, conductive foam, flexible printed circuit, and so forth. The transducer connector 224 may be configured to transfer electrical power, electrical signals, optical signals, and so forth between the transducer 110 and devices, such as the FPC 222.

A retention piece 226 may be placed between the FPC 222 within the channel and the exterior environment. The retention piece 226 may comprise an overmolded component, a channel seal, a channel cover, and so forth. For example, the material comprising the retention piece 226 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 226 may be affixed to the channel or a portion thereof using adhesive, pressure, and so forth. In yet another example, the retention piece 226 may be formed within the channel using an additive technique, such as using an extrusion head to deposit a plastic or resin within the channel, a laser to sinter a powdered material, and so forth. The FPC 222 may be maintained within the channel by the retention piece 226. The retention piece 226 may also provide protection from environmental contaminants such as dust, water, and so forth.

The retention piece 226 may be sized to retain the FPC 222 within the channel. The retention piece 226 may include one or more engagement features. The engagement features may be used to facilitate retention of the retention piece 226 within the channel of the front frame 206. For example, the distal ends of the retention piece 226 may include protrusions configured to engage a corresponding groove or receptacle within a portion of the front frame 206. Instead of, or in addition to the engagement features, an adhesive may be used to bond at least a portion of the retention piece 226 to at least a portion of the channel in the front frame 206.

The retention piece 226 may comprise a single material, or a combination of materials. The material may comprise one or more of an elastomer, a polymer, a ceramic, a metal, a composite material, and so forth. The material of the retention piece 226 may be rigid or elastomeric. For example, the retention piece 226 may comprise a metal or a resin. In implementations where the retention piece 226 is rigid, a retention feature such as a tab or slot may be used to maintain the retention piece 226 in place in the channel of the front frame 206. In another example, the retention piece 226 may comprise a silicone plastic, a room temperature vulcanizing rubber, or other elastomer.

The retention piece 226 may comprise a single piece, or several pieces. For example, the retention piece 226 may comprise a single piece produced using injection molding techniques. In some implementations, the retention piece 226 may comprise an overmolded piece.

One or more components of the HMWD 106 may comprise single unitary pieces or may comprise several discrete pieces. For example, the front frame 206, the nosepiece 108, and so forth may comprise a single piece, or may be constructed from several pieces joined or otherwise assembled.

In some implementations, the front frame 206 may be used to retain the lenses 214. For example, the front frame 206 may comprise a unitary piece or assembly that encompasses at least a portion of a perimeter of each lens.

Figure 3:
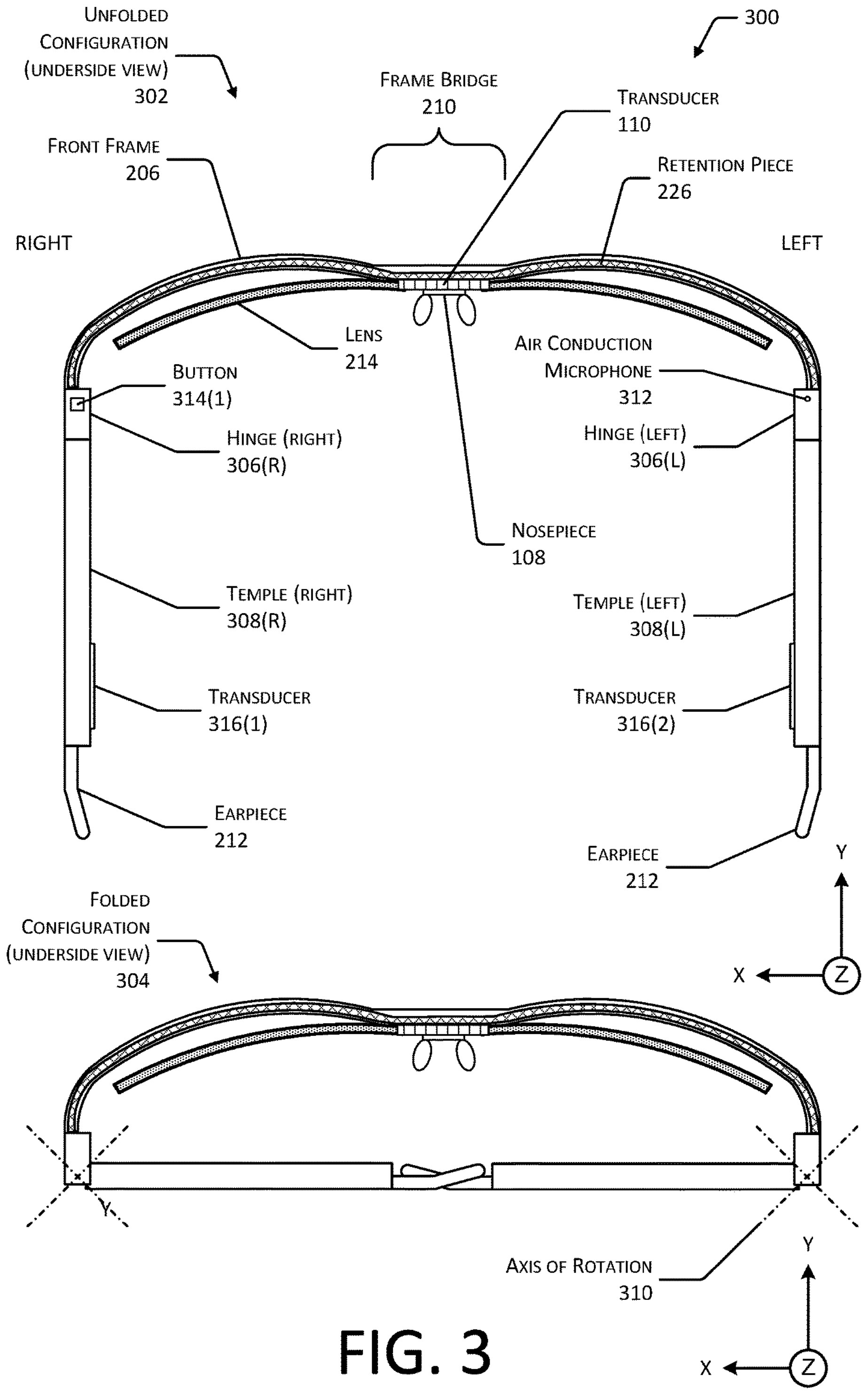
FIG. 3 depicts an exterior view, from below, of the head-mounted wearable device in unfolded and folded configurations, according to some implementations.

FIG. 3 depicts exterior views 300, from below looking up, of the HMWD 106, including a view in an unfolded configuration 302 and in a folded configuration 304, according to some implementations. The retention piece 226 that is placed within a channel of the front frame 206 is visible in this view from underneath the HMWD 106.

Also visible in this view are the lenses 214 of the lens assembly 220. Because the lens assembly 220 is affixed to the front frame 206 at the frame bridge 210, the front frame 206 may flex without affecting the positioning of the lenses 214 with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. Depicted is a left hinge 306(L) and a right hinge 306(R) on the left and right sides of the front frame 206. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 310. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the folded configuration 304.

One or more of the front frame 206, the hinge 306, or the temple 308 may be configured to dampen the transfer of vibrations between the front frame 206 and the temples 308. For example, the hinge 306 may incorporate vibration dampening structures or materials to attenuate the propagation of vibrations between the front frame 206 and the temples 308. These vibration dampening structures may include elastomeric materials, springs, and so forth. In another example, the portion of the temple 308 that connects to the hinge 306 may comprise an elastomeric material.

One or more different sensors may be placed on the HMWD 106. For example, in addition to the transducer 110, an air conduction microphone 312 may be emplaced within or proximate to the left hinge 306(L), such as on the underside of the left hinge 306(L). One or more buttons 314 may be placed in other locations on the HMWD 106. For example, a button 314(1) may be emplaced within, or proximate to, the right hinge 306(R), such as on an underside of the right hinge 306(R).

One or more transducers 316 may be emplaced on the temples 308. For example, as depicted here a transducer 316(1) may be located on the surface of the temple 308(R) that is proximate to the head 104 of the user 102 during use. Continuing the example, as depicted here a transducer 316(2) may be located on the surface of the temple 308(L) that is proximate to the head 104 of the user 102 during use. The transducer 316 may be configured to generate acoustic output. For example, the transducer 316 may comprise a speaker that provides audio to the user 102 via bone conduction through the temporal bone of the head 104.

Extending from a portion of the temple 308 that is distal to the front frame 206, is the earpiece 212. The earpiece 212 may comprise a material that may be reshaped to accommodate the anatomy of the head 104. For example, the earpiece 212 may comprise a thermoplastic that may be warmed to a predetermined temperature and reshaped. In another example, the earpiece 212 may comprise a wire that may be bent to fit. The wire may be encased in an elastomeric material.

The FPC 222 provides connectivity between the electronics in the temples 308. For example, the left temple 308(L)

may include electronics such as a hardware processor while the right temple 308(R) may include electronics such as a battery. The FPC 222 provides a pathway for control signals from the hardware processor to the battery, may transfer electrical power from the battery to the hardware processor, and so forth. The FPC 222 may provide additional functions such as providing connectivity to the air conduction microphone 312, the button 314(1), components within the front frame 206, and so forth. For example, a front facing camera may be mounted within the frame bridge 210 and may be connected to the FPC 222 to provide image data to the hardware processor in the temple 308.

Figure 4:
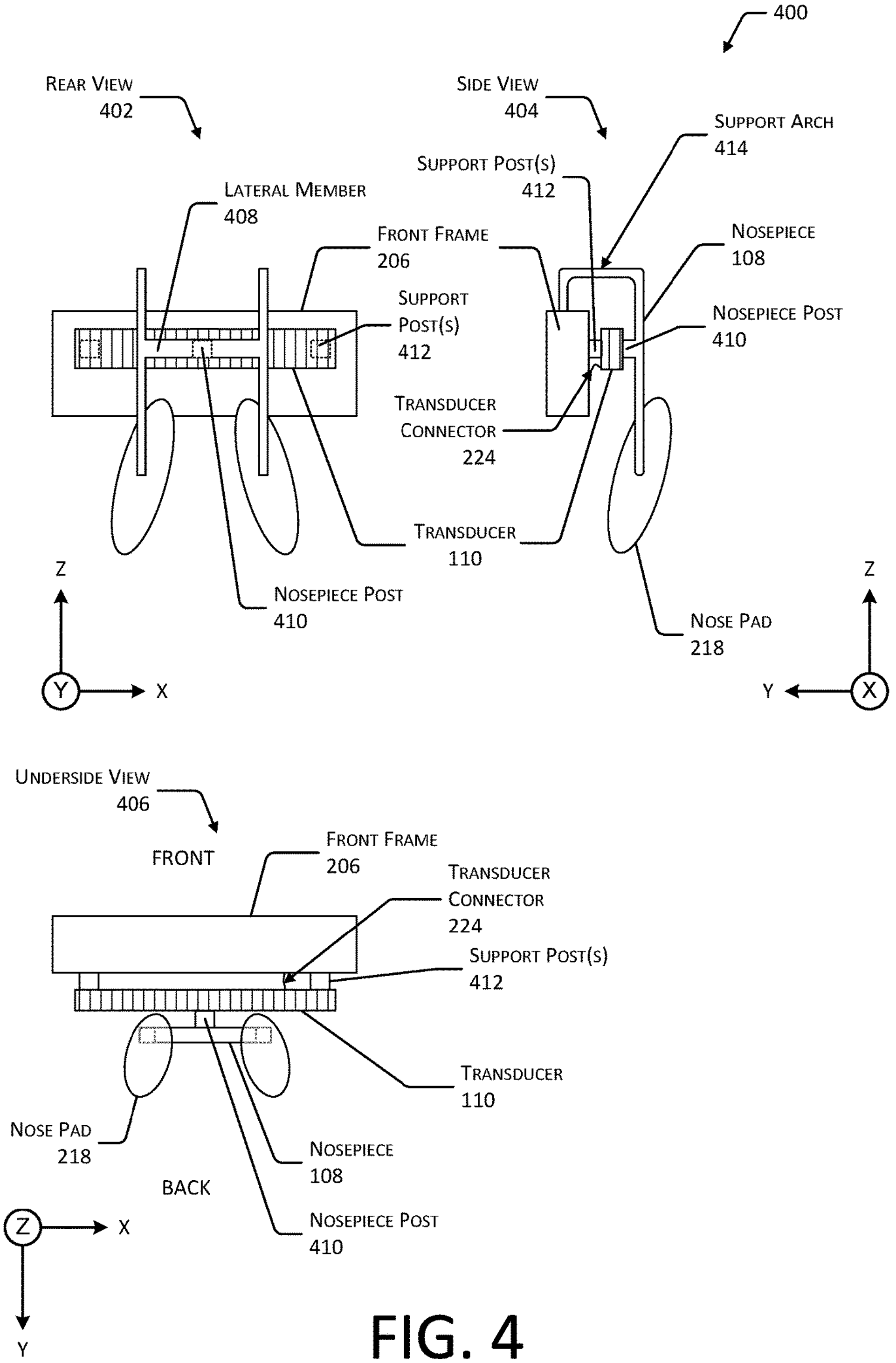
FIG. 4 depicts three views of a first implementation of the nosepiece including a transducer to act as a bone conduction microphone.

FIG. 4 depicts three views 400 of a first implementation of the nosepiece 108 including a transducer 110 to act as a bone conduction microphone. Depicted is an enlargement of the portion of the HMWD 106 that includes the nosepiece 108 with a rear view 402, a side view 404, and an underside view 406. The structures described may be affixed to at least a portion of one or more of the front frame 206 (as depicted), the frame bridge 210, one or more lenses 214, the lens bridge 216, or another portion of the HMWD 106.

The nosepiece 108 as depicted in FIG. 4 comprises a lateral member 408 that extends from left to right. The lateral member 408 has a back that is proximate to the user during operation and a front that is opposite the back. At least one nosepiece post 410 or other protuberance extends away from the front of the lateral member 408. A pair of nose pads 218 is affixed to, or integral with, the lateral member 408. For example, a pad arm may join the nose pad 218 to the lateral member 408. In another example, the lateral member 408 and the pair of nose pads 218 may comprise a unitary piece, such as a single piece of molded plastic.

A transducer 110 is arranged in front of and in contact with the nosepiece post 410. The transducer 110, in turn, is mounted to the back of the front frame 206 by a first support post 412(1) arranged proximate to a first end of the transducer 110 and a second support post 412(2) arranged proximate to a second end of the transducer 110. In this arrangement, the transducer 110 and the support posts 412 may be visualized as a post and lintel arrangement.

The transducer connector 224 may couple the transducer 110 to another device, such as the FPC 222 in the front frame 206. In some implementations the support posts 412 may be conductive and may be used as the transducer connector 224.

The transducer 110 may comprise a device that is able to generate output indicative of audio frequency vibrations having frequencies occurring between about 10 hertz and at least 22 kilohertz (kHz). In some implementations the transducer 110 may be sensitive to a particular band of audio frequencies within this range. For example, the transducer 110 may be sensitive from 100 Hz to 4 kHz. In one implementation the transducer 110 may comprise an accelerometer. For example, the transducer 110 may comprise a piezo-ceramic accelerometer in the BU product family as produced by Knowles Corporation of Itasca, Ill. Continuing the example, the Knowles BU-23842 vibration transducer provides an analog output signal that may be processed as would the analog output from a conventional air conduction microphone. The accelerometer may utilize piezoelectric elements, microelectromechanical elements, optical elements, capacitive elements, and so forth.

In another implementation the transducer 110 comprises a piezoelectric transducer that uses piezoelectric material to generate an electronic signal responsive to the deflection of the transducer 110 between the support posts 412. For example, the transducer 110 may comprise a piezoelectric bar device.

In yet another implementation, the transducer 110 may comprise electromagnetic coils, an armature, and so forth. For example, the transducer 110 may comprise a variation on the balanced electromagnetic separation transducer (BEST) as proposed by Bo E. V. Hakansson of the Chalmers University of Technology in Sweden that is configured to detect vibration.

The transducer 110 may detect vibrations using other mechanisms. For example, a force sensitive resistor may be used to detect the vibration. In another example the transducer 110 may measure changes in electrical capacitance to detect the vibrations.

The transducer 110 may include or be connected to circuitry that generates or amplifies the output from the transducer 110. For example, the accelerometer may produce an analog signal as the output. This analog signal may be provided to an analog to digital converter (ADC). The ADC measures an analog waveform and generates an output of digital data. A processor may subsequently process the digital data.

While two support posts 412 are depicted, in other implementations different counts, arrangements, shapes, and so forth of supports may be utilized. The support posts 412 may comprise a rigid material, such as a solid metal or ceramic, or they may comprise one or more of an elastomeric material or a spring. The use of an elastomeric material or spring at the junction between the transducer 110 and the front frame 206 may be used to attenuate the transfer of vibrations of the front frame 206 to the transducer 110, facilitate motion resulting from the vibrations, and so forth. For example, the support posts 412 may comprise helical springs. The support posts 412 may be separate pieces inserted during assembly, may extend from one or more of the front frame 206 or the transducer 110, and so forth.

In some implementations, one or more support arches 414 or other structures may extend from the lateral member 408 of the nosepiece 108 to the front frame 206. The support arch 414 may comprise a separate piece, or may be integral with the lateral member 408. The support arch 414 provides mechanical support for the lateral member 408 and associated structure with respect to the front frame 206, while allowing the transfer of vibration from the nose pads 218 to the transducer 110. For example, the support arch 414 may allow for movement of the lateral member 408 along the Y axis (indicated here as perpendicular to the face of the user 102 during operation) while providing mechanical support along the X and Z axes during normal wear of the HMWD 106. The support arch 414 may be exposed or located within a housing or other structure. In this illustration, the support arch 414 is depicted as extending above the nosepiece 108. However, in other implementations the support arches 414 may be positioned to the sides or below the nose piece 108.

In some implementations, the transducer connector 224 may be mounted to, embedded within, or may be integral with the support arch 414. For example, the support arch 414 may comprise a conductive material that is used to transfer electrical power, signals, and so forth between devices in the front frame 206 and the transducer 110. In another implementation, a cable or other wiring may be used.

Instead of, or in addition to, an arcuate member such as the support arch 414, in other implementations other structures may be used. For example, one or more springs, hinges, rollers, sliding surfaces, and so forth may be used to provide mechanical support to the lateral member 408 while permitting transfer of vibrations from the user 102 to the transducer 110.

During operation of this implementation, vibrations present at the portion of the nose of the user 102 where the nose pads 218 are resting are transferred to the lateral member 408 and the nosepiece post 410. The vibrations in turn apply a pressure to the midpoint of the transducer 110, deflecting it between the support posts 412. In some implementations the nosepiece post 410 may be bonded, glued, or integral with the transducer 110. In another implementation the nosepiece post 410 and a surface of the transducer 110 may be touching but not joined. In yet another implementation, a plastic cover or layer may be arranged between the nosepiece post 410 and the surface of the transducer 110. In this implementation, an adhesive may be used on one or both sides of the plastic cover to join the transducer 110 to the plastic cover and the plastic cover to the nosepiece post 410, respectively. The deflection of the transducer 110 that results from the vibrations transferred by the nosepiece post 410 generates output that may be used as an audio signal.

The transducer 110 may be connected to the flexible printed circuit (FPC) 222 comprising a plurality of electrical conductors or other elements. The FPC 222 may be used to connect the transducer 110 to other electronics in the HMWD 106. For example, the FPC 222 may provide electrical power, conductors for signal transfer, and so forth. As described below with regard to FIG. 7, the FPC 222 is located at least partially within the front frame and connected to the transducer 110.

In some implementations the transducer 110 may be optical rather than electronic. For example, the transducer 110 may comprise an optical strain gauge or vibration sensing element such as an optical fiber that is affixed to or embedded with another material, such as the lateral member 408, pad arms, and so forth. Deflection of the optical fiber by impinging vibration may result in changes in phase, intensity, polarization, and so forth that may be detected optically to generate an output signal. At least a portion of the optical elements may be mounted to another structure such as the front frame 206, embedded within another structure, concealed beneath a housing or cover layer, and so forth.

Figure 5:
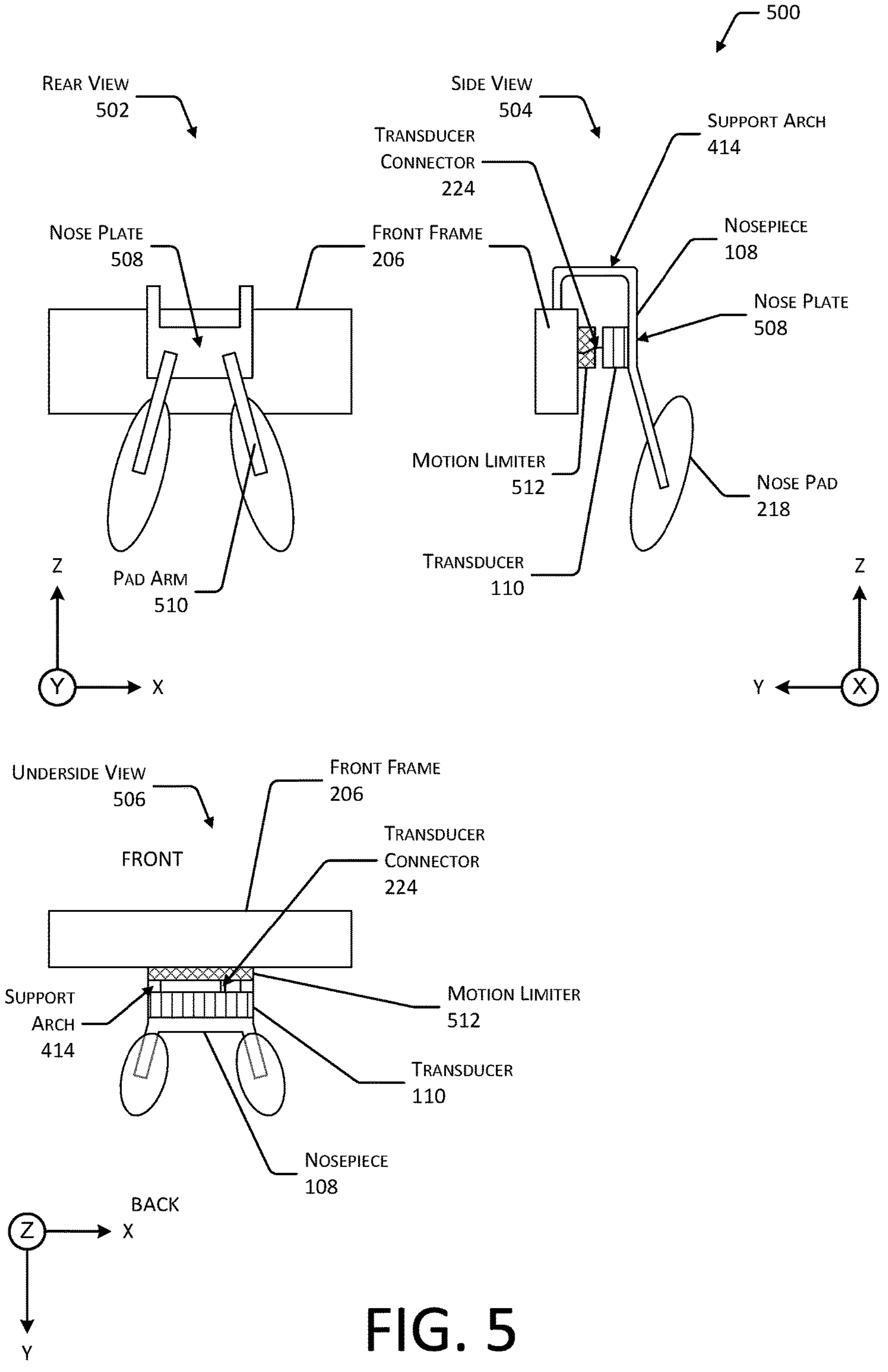
FIG. 5 depicts three views of a second implementation of the nosepiece including a transducer to act as a bone conduction microphone.

FIG. 5 depicts three views 500 of a second implementation of the nosepiece 108 including a transducer 110 to act as a bone conduction microphone. Depicted is an enlargement of the portion of the HMWD 106 that includes the nosepiece 108 with a rear view 502, a side view 504, and an underside view 506. The structures described may be affixed to at least a portion of one or more of the front frame 206 (as depicted), the frame bridge 210, one or more lenses 214, the lens bridge 216, or another portion of the HMWD 106.

The nosepiece 108 as depicted in FIG. 5 comprises a nose plate 508. The nose plate 508 has a back surface that is proximate to the user 102 during operation and a front surface that is opposite the back surface. A pair of nose pads 218 is affixed to, or integral with, the nose plate 508. For example, a pad arm 510 may join the nose pad 218 to the nose plate 508. In another example, the nose plate 508 and the pair of nose pads 218 may comprise a unitary piece, such as a single piece of molded plastic.

A transducer 110 is affixed to the nose plate 508. For example, the transducer 110 may be affixed to the front of the nose plate 508, between the nose plate and the front frame 206. In some implementations, such as those using the support arches 412, an air gap may be present between the transducer 110 and the front frame 206. The support arch 414 may be exposed or located within a housing or other structure.

In some implementations, the transducer connector 224 may be mounted to, embedded within, or may be integral with the support arch 414. For example, the support arch 414 may comprise a conductive material that is used to transfer electrical power, signals, and so forth between devices in the front frame 206 and the transducer 110.

A motion limiter 512 may be positioned between the front of the nose plate 508 and the back of the frame bridge 206. The motion limiter 512 may comprise one or more of an elastomeric material, foam, spring, magnet, or mass. For example, the motion limiter 512 may comprise a piece of closed cell foam. In other implementations, the motion limiter 512 may comprise a hard or non-elastomeric material. For example, the motion limiter 512 may comprise a rigid plastic element mounted to (or integral with) the back of the front frame 206. In this example, the motion limiter 512 may be separated from the transducer 110 by an air gap. During use, the support arch 414 may serve to attenuate the transfer of vibrations between the nosepiece 108 and the front frame 206. The motion limiter 512 may provide a stop that prevents the nosepiece 108 from moving too far and potentially straining or breaking the support arch 414. The support arch 414 may be exposed or located within a housing or other structure.

The motion limiter 512 may be used to attenuate the transfer of vibrations of the front frame 206 to the transducer 110, provide room for movement of the transducer 110, and so forth. For example, the motion limiter 512 may comprise a layer of vibration-attenuating material such as silicone rubber that allows for the transducer 110 to move relative to the front frame 206 in response to vibrations from the user 102, while also dampening vibrations from the front frame 206 into the transducer 110. This may improve the signal-to-noise ratio of the user's 102 speech relative to external noise that may result from the user 102 touching the HMWD 106 frame, movement of the head 104, external sounds that may be conducted from the lenses 214 into the frame of the HMWD 106, and so forth. In some implementations the motion limiter 512 may be omitted. For example, an air gap may be present between the transducer 110 and the front frame 206.

In some implementations the motion limiter 512 may permit motion in some directions while preventing or attenuating motion in other directions. For example, the motion limiter 512 may comprise a pair of magnets configured with the same magnetic polarity facing each other to produce a magnetic repulsion. Supports may be provided that maintain the relative position of the magnets with respect to one another while allowing motion towards and away from one another under the influence of the magnetic repulsion. Continuing the example, the magnetic motion limiter 512 may allow for motion along a Y axis while attenuating motion along Z and X axes. In another example, one or more springs may be used in place of the magnets. For example, the motion limiter 512 may use a helical spring.

As illustrated here, the motion limiter 512 may be separated by a gap from the transducer 110. In this situation, the motion limiter 512 may act as a stop or block to prevent motion of the transducer 110 from exceeding a threshold distance. For example, the motion limiter 512 may allow the transducer 110 to travel at most 0.5 millimeters towards the front face 206. In other implementations, no gap may be present and the motion limiter 512 may be in contact with the front frame 206 and the transducer 110 during normal operation.

The transducer connector 224 may extend through, past, or around the motion limiter 512. For example, the motion limiter 512 may have an aperture or channel through which the transducer connector 224 passes.

In some implementations, one or more support arches 414 or other structures may extend from the nose plate 508 of the nosepiece 108 to the front frame 206. The support arch 414 may comprise a separate piece, or may be integral with the nose plate 508. The support arch 414 provides mechanical support for the nose plate 508 and associated structures with respect to the front frame 206, while allowing the transfer of vibration from the nose pads 218 to the transducer 110. For example, the support arch 414 may allow for movement of the nose plate 508 along the Y axis (indicated here as perpendicular to the face of the user 102 during operation) while providing mechanical support along the X and Z axes during normal wear of the HMWD 106. The motion limiter 512 may also prevent damage to the support arch 414 by restricting travel of the transducer 110 to a predetermined range. In some implementations the support arch 414 may be within a housing or other structure.

Instead of, or in addition to, an arcuate member such as the support arch 414, in other implementations other structures may be used. For example, one or more springs, hinges, rollers, sliding surfaces, and so forth may be used to provide mechanical support to the nose plate 508 while permitting transfer of vibrations from the user 102 to the transducer 110.

During operation of this implementation, vibrations present at the portion of the nose of the user 102 where the nose pads 218 are resting are transferred to the nose plate 508. The vibrations in turn move the transducer 110, which may then produce an output signal.

As described above, the transducer 110 may comprise an accelerometer, piezoelectric transducer, and so forth. The transducer 110 may be connected to other electronics in the HMWD 106 using the FPC 222.

Figure 6:
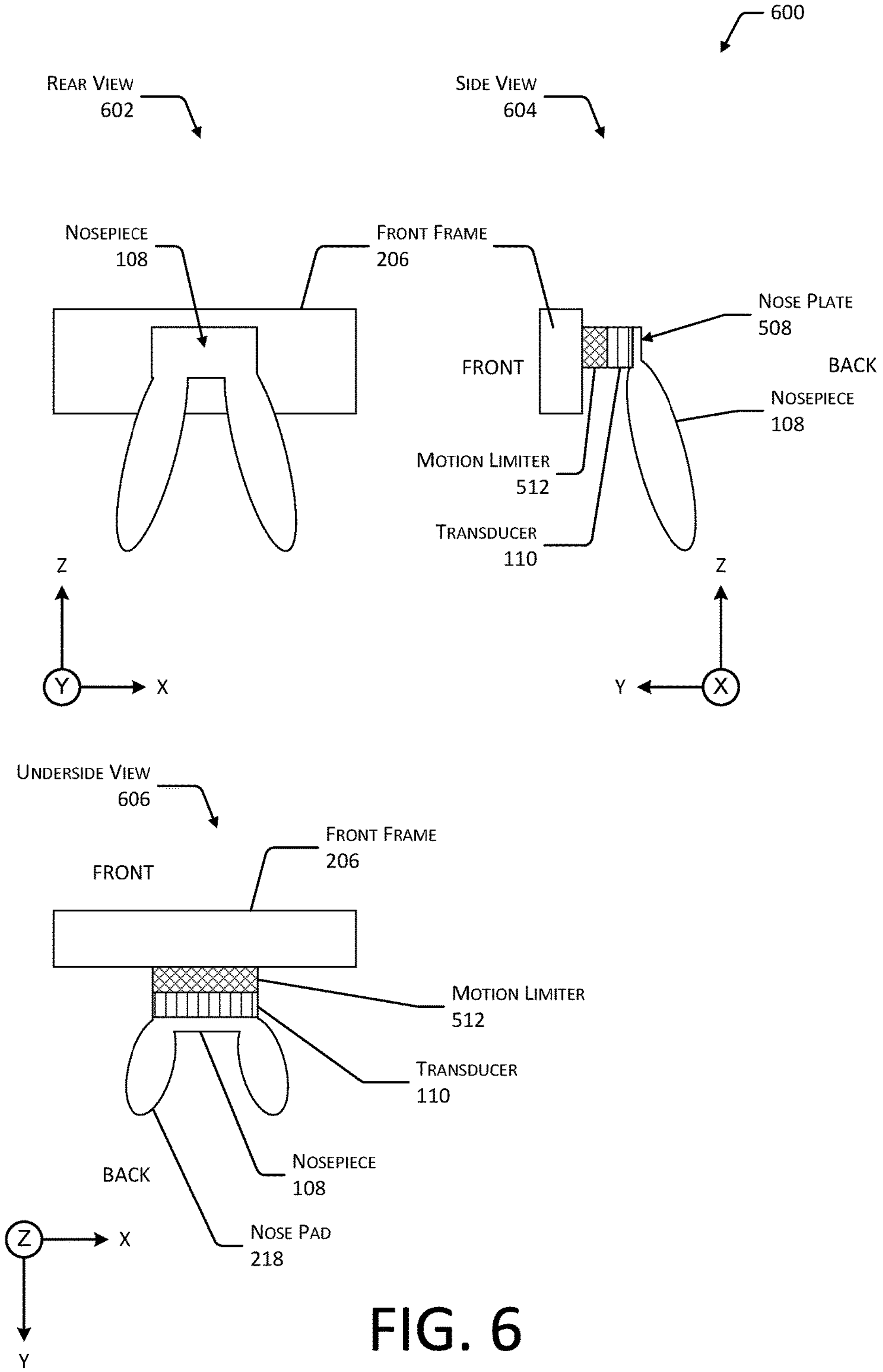
FIG. 6 depicts three views of a third implementation of the nosepiece including a transducer to act as a bone conduction microphone.

FIG. 6 depicts three views 600 of a third implementation of the nosepiece 108 including a transducer 110 to act as a bone conduction microphone. Depicted is an enlargement of the portion of the HMWD 106 that includes the nosepiece 108 with a rear view 602, a side view 604, and an underside view 606. The structures described may be affixed to at least a portion of one or more of the front frame 206 (as depicted), the frame bridge 210, one or more lenses 214, the lens bridge 216, or another portion of the HMWD 106.

The nosepiece 108 as depicted in FIG. 6 comprises a nose plate 508. The nose plate 508 has a back surface that is proximate to the user 102 during operation and a front surface that is opposite the back surface. A pair of nose pads 218 is affixed to, or integral with, the nose plate 508. For example, the nose plate 508 and the pair of nose pads 218 may comprise a unitary piece, such as a single piece of molded plastic as depicted here. In another example, a pad arm 510 may join the nose pad 218 to the nose plate 508.

A transducer 110 is affixed to the nose plate 508. The transducer 110 may be affixed to the front of the nose plate 508, between the nose plate and the front frame 206. In another implementation, the transducer 110 may be affixed to the back of the nose plate 508.

A motion limiter 512 is affixed to the front of the transducer 110 (or the nose plate 508) and to the back of the frame bridge 206, joining the transducer 110 (or the nose plate 508) to the front frame 206. The motion limiter 512 may comprise one or more of an elastomeric material, foam, or spring. For example, the motion limiter 512 may comprise a layer of silicone rubber. The transducer connector 224 may extend through, past, or around the motion limiter 512. The motion limiter 512 may attenuate the transfer of vibrations of the front frame 206 to the transducer 110, provide room for movement of the transducer 110, and so forth. This may improve the signal-to-noise ratio of the user's 102 speech relative to external noise that may result from the user 102 touching the HMWD 106 frame, external sounds that may be conducted from the lenses 214 into the frame of the HMWD 106, and so forth. During operation of this implementation, vibrations present at the portion of the nose of the user 102 where the nose pads 218 are resting are transferred to the nose plate 508. The vibrations in turn move the transducer 110, which may then produce an output signal. In another implementation the motion limiter 512 may be omitted, and the front of the transducer 110 may be affixed to the front frame 206.

As described above, the transducer 110 may comprise an accelerometer, piezoelectric transducer, and so forth. The transducer 110 may be connected to other electronics in the HMWD 106 using the FPC 222 by way of the transducer connector 224. For example, the motion limiter 512 may comprise an elastomeric pad with electrically conductive pathways that are used to carry signals between the transducer 110 and the FPC 222.

One or more air conduction microphones may be arranged proximate to the transducer 110, mounted in the front frame 206, mounted at the hinge 306, or at other positions on or within the HMWD 106. For example, an air conduction microphone may be emplaced proximate to or within the nosepiece 108. This air conduction microphone may be used to acquire an audio signal. The audio signal may be used independently of or combined with the signal from the transducer 110.

Figure 7:
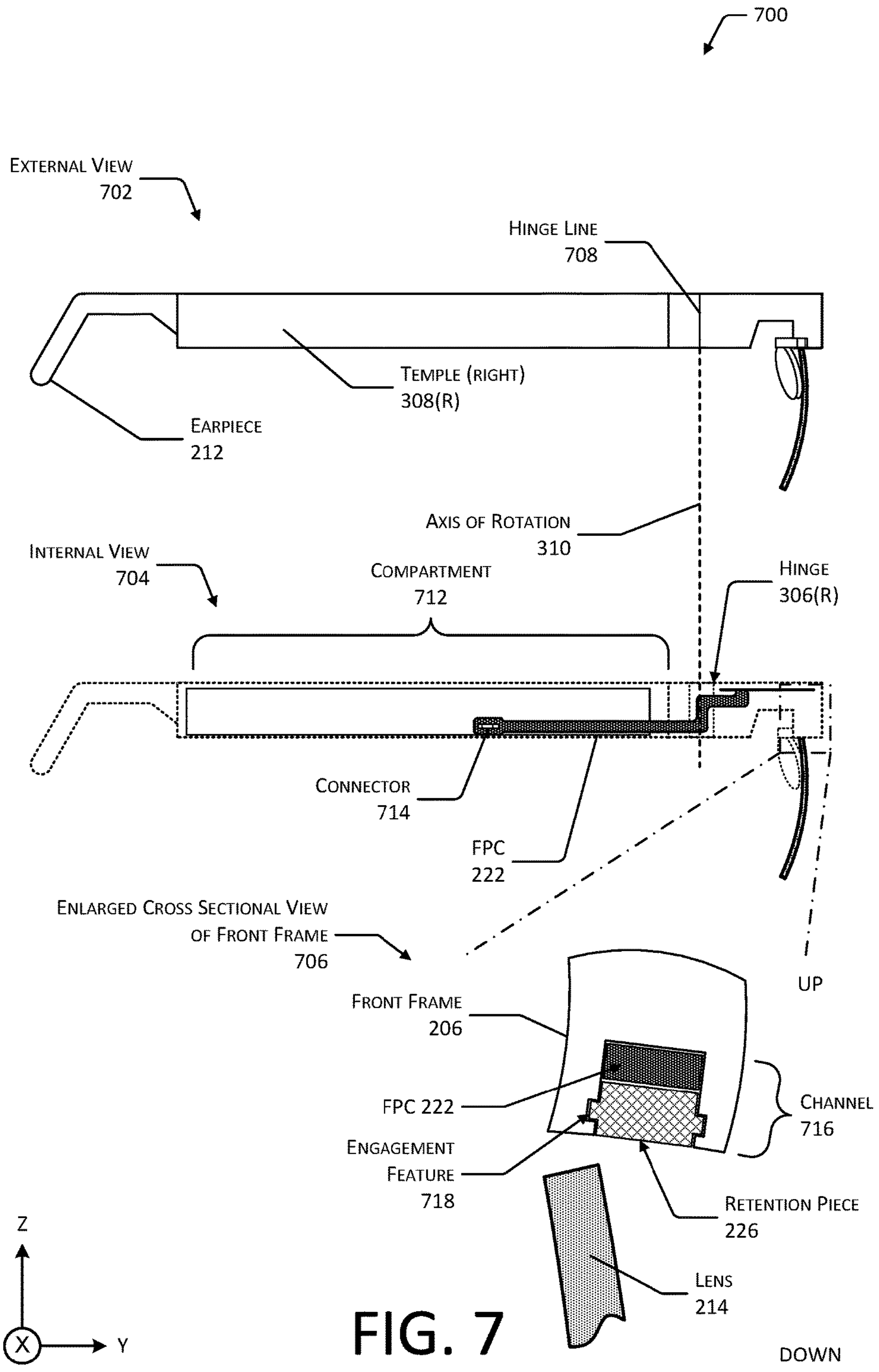
FIG. 7 depicts exterior and interior side views of some of the components of the head-mounted wearable device, according to some implementations.

FIG. 7 depicts views 700 of some of the components of the HMWD 106, according to some implementations. An external view 702 and an internal view 704 of the right side of the HMWD 106 are shown. Also shown is an enlarged sectional view 706 of the front frame 206.

The external view 702 depicts the hinge line 708. The hinge line is the external feature that parallels the axis of rotation 310.

The internal view 704 depicts the FPC 222 passing from the front frame 206 through the hinge 306 and into a compartment 712 of the temple 308. The compartment 712 may house the electronics or other devices within the temple 308. The FPC 222 may couple to a connector 714 located on the electronics. The connector 714 may comprise pads, pogo pins, or other connection mechanisms.

In the enlarged cross-sectional view 706 of the front frame 206, the channel 716 is depicted. The channel 716 may have a substantially rectangular cross-section as depicted here. In other implementations, the channel 716 may employ other cross-sectional shapes.

The channel 716 may extend contiguously along the front frame 206 from the left hinge 306(L) to the right hinge 306(R). For example, the channel 716 may extend from the left hinge 306(L), across the left brow section 208(L), across the frame bridge 210, across the right brow section 208(R), and across the right hinge 306(R).

The FPC 222 may be emplaced within the channel 716, and the retention piece 226 may be used to retain the FPC 222 within the channel 716. For example, during assembly the front frame 206 may be placed upside down, the FPC 222 may be laid within, and the retention piece 226 may be inserted.

The channel 716 may have a width sufficient to accommodate the width of the FPC 222. For example, the channel 716 may be 2.1 millimeters wide to accommodate an FPC that is 2 mm wide.

In the implementation depicted here, the channel 716 is arranged with its opening generally downward, such as along the underside of the front frame 206. In other implementations, the channel 716 may be directed in other directions. For example, the channel 716 may be directed generally toward the head 104 of the user 102, away from the head 104 of the user 102, and so forth.

The channel 716 may include one or more engagement features 718. For example, the channel 716 may be formed to include lips, ridges, grooves, prongs, teeth, and so forth. These engagement features 718 may be used to retain the retention piece 226 within the channel 716. In some implementations, the retention piece 226 may include one or more engagement features 718. These engagement features 718 may be configured to accommodate complementary features within the channel 716. For example, the channel 716 may have an engagement feature 718 comprising a groove as illustrated here while the retention piece 226 has a corresponding engagement feature comprising a ridge that fits within the groove. The engagement features 718 may be placed at discrete points within the channel 716. For example, the engagement features of the retention piece 226 may be arranged at the ends of the retention piece 226 proximate to the hinges 306.

Figure 8:
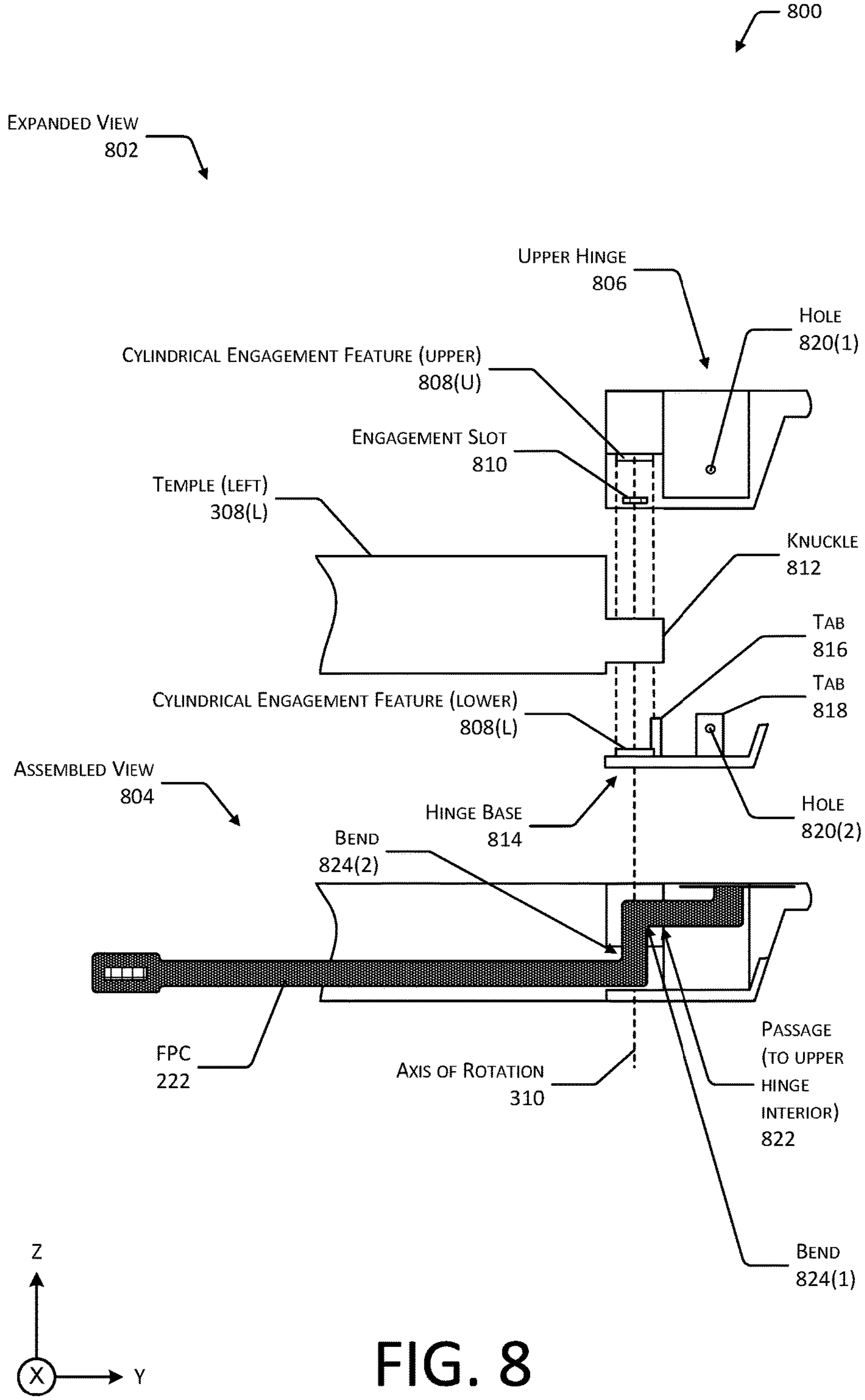
FIG. 8 depicts an enlarged view of some components of a hinge and a flexible printed circuit (FPC) passing through the hinge, according to some implementations.

FIG. 8 depicts an enlarged view 800 of some components of a hinge 306 and the FPC 222 passing through the hinge 306, according to some implementations. Depicted is an expanded view 802 and assembled view 804.

In the expanded view 802 an upper hinge 806 is depicted. In some implementations, the upper hinge 806 may be a component separate from the front frame 206, or may be an integral portion of the front frame. For example, the upper hinge 806 may be machined from the same block of material and may be unitary with the front frame 206.

The upper hinge 806 may have a cylindrical engagement feature 808(U). The cylindrical engagement feature 808 may have an opening in its interior, providing an open core through which the FPC 222 may be routed. The open core may comprise a hole or passageway that is within the perimeter of the cylindrical engagement feature 808. In some implementations the opening may be centered, or may be off center. The cross section of the open core may be circular, square, elliptical, or any other regular polygon or irregular shape. The upper hinge 806 may also include an engagement slot 810 or other engagement features.

The temple 308 may include a knuckle 812. The knuckle 812 comprises a protrusion extending from or attached to the temple 308. The knuckle 812 also includes an open core through which the FPC 222 may be routed. The open core of the knuckle 812 is sized to mechanically engage the cylindrical engagement feature 808. For example, the open core may have an inner diameter that is slightly larger than an outer diameter of the cylindrical engagement feature 808.

The hinge base 814 may also include a cylindrical engagement feature 808(L) configured to engage the open core of the knuckle 812 at an end opposite the upper hinge 806. The hinge base 814 may include one or more engagement features that may be used to affix the hinge base 814 to the upper hinge 806. For example, the hinge base 814 may include a tab 816. The hinge base 814 may include another tab 818 through which a hole 820 has been formed. In some implementations, the hinge 306 may include the upper hinge 806 and the hinge base 814.

The assembled view 804 depicts the HMWD 106 in the unfolded configuration. In the assembled view 804, the knuckle 812 has been retained between the cylindrical engagement feature 808(U) of the upper hinge 806 and the cylindrical engagement feature 808(L) of the hinge base 814. Many different engagement features or techniques may be used to join the upper hinge 806 and the hinge base 814. In one technique illustrated here, the tab 816 may be configured to enter a receptacle in the upper hinge 806. In some implementations, the receptacle on the upper hinge 806 may be adhesive lined, filled with an adhesive, and so forth. In another technique illustrated here, the upper hinge 806 includes a first hole 820(1), while the hinge base 814 further includes a tab 818 having a second hole 820(2). A threaded fastener, such as a screw, may be passed through the first hole 820(1) and the second hole 820(2) to join the upper hinge 806 and the hinge base 814. In yet another technique illustrated here, a tab or protrusion (not shown) extending from the hinge base 814 may be configured to engage the engagement slot 810 of the upper hinge 806.

The FPC 222 as illustrated in the assembled view 804 may be routed through a passage 822 that extends from the interior of the upper hinge 806 into the open core of cylindrical engagement feature 808(U) of the upper hinge 806. At this transition from the passage 822 down towards the knuckle 812, the FPC 222 may have an approximately right angle first bend 824(1). The FPC 222 may have an approximately right angle second bend 824(2) at the transition from the interior of the open core of the knuckle 812 through the slot into the compartment 712 of the temple 308. The portion of the FPC 222 extending from the first bend 824(1) to the second bend 824(2) may have a long axis that is approximately parallel to the axis of rotation 310.

During rotation about the axis of rotation 318, the FPC 222 extending through the open core of the hinge 306 experiences the torsion or twisting. In some implementations, the angular displacement between the FPC 222 at the first bend 824(1) and the second bend 824(2) may range from 0 degrees in the unfolded configuration to less than 120 degrees in the folded configuration.

The path followed by the FPC 222 may extend from a left compartment 712(L) through the left slot in the left compartment 712(L) into the open core of the left temple knuckle 812, through the left upper cylindrical engagement feature 808(U), through the left upper hinge 806(L), along the channel 716, through the right upper hinge 806(R), through the open core of the right upper cylindrical engagement feature 808(U), through the open core of the right temple knuckle 812, through the right slot into the right compartment 712(R).

In some implementations, the knuckle 812 may not have a passage that extends completely through. For example, the open core may extend from an upper portion of the knuckle to a point below the slot. A recess that is cylindrical in cross section may then extend from the bottom of the knuckle 812 upwards. Thus, the open core may include a wall or partition that may divide the core of the knuckle 812 into two sections, an upper section and a lower section. The FPC 222 may pass through the upper section, and the upper section may engage the upper cylindrical engagement feature 808 (U) while the lower section may engage the lower cylindrical engagement feature 808(L).

In some implementations, the hinge base 814 may be omitted. For example, the knuckle 812 may be configured to couple to the upper hinge 806.

The FPC 222 may be constructed to pass through the slot, the open core, the channel 716, and so forth. For example, the FPC 222 may be constructed with a first dimension, such as width, that is less than or equal to a diameter of the open core of the knuckle 812 and a second dimension (such as thickness) that is less than or equal to a height of the slot.

Figure 9:
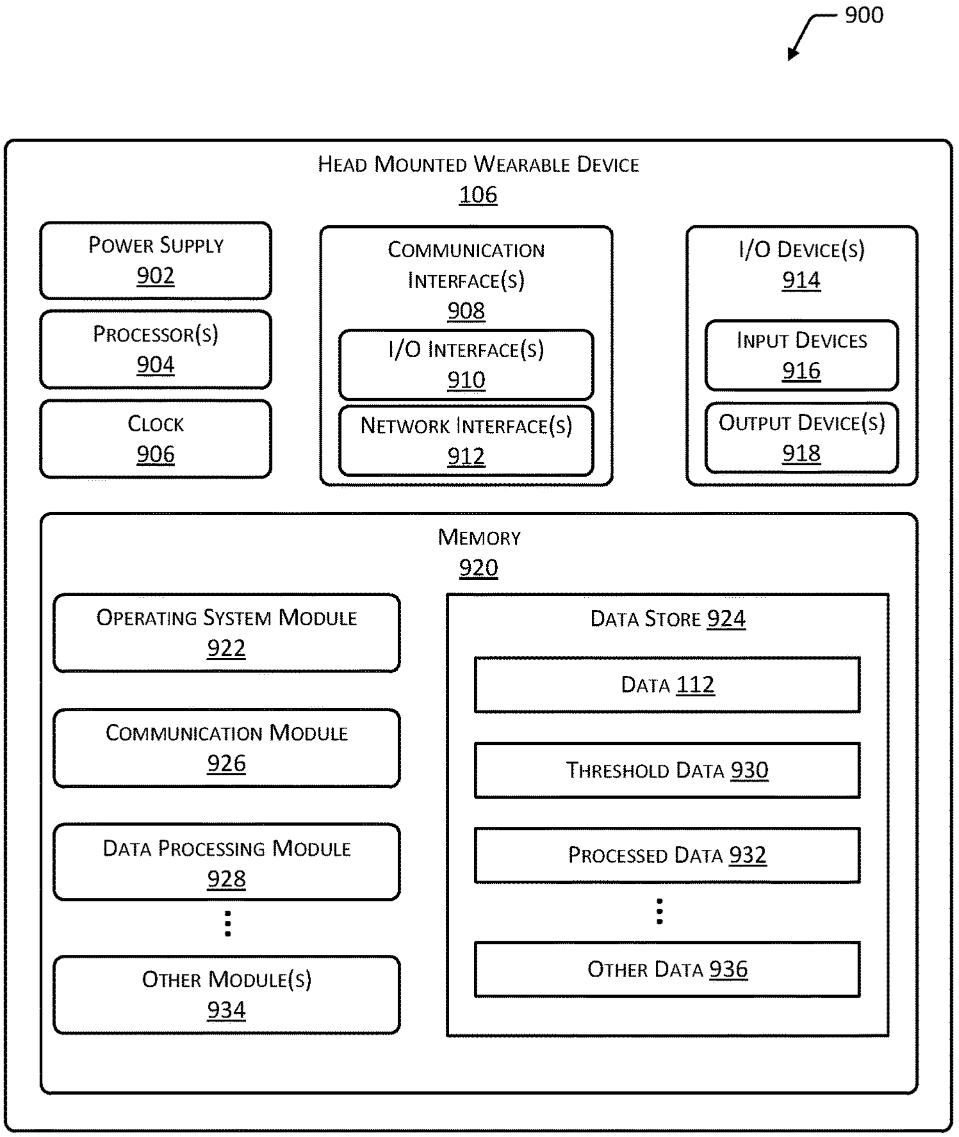
FIG. 9 is a block diagram of electronic components of the head-mounted wearable device, according to some implementations.

FIG. 9 is a block diagram 900 of electronic components of the HMWD 106, according to some implementations.

One or more power supplies 902 may be configured to provide electrical power suitable for operating the components in the HMWD 106. The one or more power supplies 902 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The HMWD 106 may include one or more communication interfaces 908 such as input/output (I/O) interfaces 910, network interfaces 912, and so forth. The communication interfaces 908 enable the HMWD 106, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices 916 such as one or more sensors, buttons, and so forth. The input devices 916 include the transducer 110. The I/O devices 914 may also include output devices 918 such as one or more of a display screen, display lights, audio speakers, and so forth. In some embodiments, the I/O devices 914 may be physically incorporated with the HMWD 106 or may be externally placed. The output devices 918 are configured to generate signals, which may be perceived by the user 102 or may be detected by sensors.

Haptic output devices 918(1) are configured to provide a signal that results in a tactile sensation to the user 102. The haptic output devices 918(1) may use one or more mechanisms such as electrical stimulation or mechanical displacement to provide the signal. For example, the haptic output devices 918(1) may be configured to generate a modulated electrical signal, which produces an apparent tactile sensation in one or more fingers of the user 102. In another example, the haptic output devices 918(1) may comprise piezoelectric or rotary motor devices configured to provide a vibration, which may be felt by the user 102. In some implementations, the haptic output devices 918(1) may be used to produce vibrations that may be transferred to one or more bones in the head 104, producing the sensation of sound. For example, while providing haptic output, the vibrations may be in the range of between 0.5 and 500 Hertz, while vibrations provided to produce the sensation of sound may be between 20 and 20,000 Hz.

One or more audio output devices 918(2) may be configured to provide acoustic output. The acoustic output includes one or more of infrasonic sound, audible sound, or ultrasonic sound. The audio output devices 918(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output. The acoustic output may be transferred by the vibration of intervening gaseous and liquid media, such as adding air, or by direct mechanical conduction. For example, an audio output device 918(2) located within the temple 308 may provide an audio signal to the user of the HMWD 106 by way of bone conduction to the user's skull, such as the mastoid process or temporal bone. In some implementations the speaker or sound produced therefrom may be placed within the ear of the user, or may be ducted towards the ear of the user.

The display devices 918(3) may be configured to provide output, which may be seen by the user 102 or detected by a light-sensitive sensor such as a camera or an optical sensor. In some implementations, the display devices 918(3) may be configured to produce output in one or more of infrared, visible, or ultraviolet light. The output may be monochrome or color.

The display devices 918(3) may be emissive, reflective, or both. An emissive display device 918(3), such as using light emitting diodes (LEDs), is configured to emit light during operation. In comparison, a reflective display device 918(3), such as using an electrophoretic element, relies on ambient light to present an image. Backlights or front lights may be used to illuminate non-emissive display devices 918(3) to provide visibility of the output in conditions where the ambient light levels are low.

The display devices 918(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 918(3) may use a light source and an array of MEMS-controlled mirrors to selectively direct light from the light source to produce an image. These display mechanisms may be configured to emit light, modulate incident light emitted from another source, or both. The display devices 918(3) may operate as panels, projectors, and so forth.

The display devices 918(3) may include image projectors. For example, the image projector may be configured to project an image onto a surface or object, such as the lens 214. The image may be generated using MEMS, LCOS, lasers, and so forth.

Other display devices 918(3) may also be used by the HMWD 106. Other output devices 918(P) may also be present. For example, the other output devices 918(P) may include scent/odor dispensers.

The network interfaces 912 may be configured to provide communications between the HMWD 106 and other devices, such as the server 116. The network interfaces 912 may include devices configured to couple to personal area networks (PANs), local area networks (LANs), wide area networks (WANs), and so forth. For example, the network interfaces 912 may include devices compatible with Ethernet, Wi-Fi™, Bluetooth®, Bluetooth® Low Energy, ZigBee®, and so forth.

The HMWD 106 may also include one or more busses or other internal communications hardware or software that allow for the transfer of data between the various modules and components of the HMWD 106.

As shown in FIG. 9, the HMWD 106 includes one or more memories 920. The memory 920 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 920 provides storage of computer-readable instructions, data structures, program modules, and other data for the operation of the HMWD 106. A few example functional modules are shown stored in the memory 920, although the same functionality may alternatively be implemented in hardware, firmware, or as a system on a chip (SoC).

The memory 920 may include at least one operating system (OS) module 922. The OS module 922 is configured to manage hardware resource devices such as the I/O interfaces 910, the I/O devices 914, the communication interfaces 908, and provide various services to applications or modules executing on the processors 904. The OS module 922 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 920 may be a data store 924 and one or more of the following modules. These modules may be executed as foreground applications, background tasks, daemons, and so forth. The data store 924 may use a flat file, database, linked list, tree, executable code, script, or other data structure to store information. In some implementations, the data store 924 or a portion of the data store 924 may be distributed across one or more other devices including servers, network attached storage devices, and so forth.

A communication module 926 may be configured to establish communications with one or more of the other HMWDs 106, servers, sensors, or other devices. The communications may be authenticated, encrypted, and so forth.

The memory 920 may store a data processing module 928. The data processing module 928 may provide one or more of the functions described herein. For example, the data processing module 928 may be configured to awaken the HMWD 106 from a sleep state, perform natural language processing, and so forth.

The data processing module 928 may utilize one or more of the data 112, threshold data 930, and so forth during operation. The threshold data 930 may specify one or more thresholds, such as permissible tolerances or variances. The data processing module 928 or other modules may generate processed data 932. For example, the processed data 932 may comprise a transcription of audio spoken by the user 102 as obtained from the transducer 110, image data to present, and so forth.

Techniques such as artificial neural networks (ANN), active appearance models (AAM), active shape models (ASM), principal component analysis (PCA), cascade classifiers, and so forth, may also be used to process the data 112. For example, the ANN may be trained using a supervised learning algorithm such that particular sounds or changes in orientation of the user's 102 head 104 to associate with particular actions to be taken. Once trained, the ANN may be provided with the data 112 and provide, as output, a transcription of the words spoken by the user, orientation of the user's 102 head 104, and so forth. In some implementations the data 112 may comprise image data. For example, cascade classifiers may be used for facial recognition, such as the Viola-Jones face detection.

Other modules 934 may also be present in the memory 920 as well as other data 936 in the data store 924. For example, the other modules 934 may include a contact management module while the other data 936 may include address information associated with a particular contact, such as an email address, telephone number, network address, uniform resource locator, and so forth.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
a nosepiece comprising:
a nose plate having a back proximate to a user during operation and a front that is opposite the back; and
a pair of nose pads;
an accelerometer affixed to the front of the nose plate, wherein the accelerometer is configured to generate data indicative of vibration transferred from a nose of the user to the nosepiece during user speech and provide output indicative of audio frequency vibrations transferred from the nose during user speech;
a motion limiter affixed to a front of the accelerometer, wherein the motion limiter comprises a vibration-attenuating elastomeric material; and
a front frame affixed to the motion limiter, wherein the motion limiter attenuates vibrations between the nosepiece and the front frame.

2. The head-mounted wearable device of claim 1, wherein the output indicative of audio frequency vibrations is analog output; and
further comprising an analog to digital converter (ADC) device, wherein the ADC device converts the analog output from the accelerometer to a digital signal.

3. The head-mounted wearable device of claim 1, further comprising one or more support arches extending from the nose plate to the front frame, wherein the one or more support arches allow the nosepiece to move relative to the front frame.

4. A head-mounted wearable device comprising:
a front frame comprising:
a left brow section,
a right brow section, and
a frame bridge joining the left brow section and the right brow section;
a nosepiece comprising:
a nose plate having a back proximate to a user during operation and a front that is opposite the back; and
a pair of nose pads;
one or more support arches extending from the nose plate to the frame bridge of the front frame; and
a transducer affixed to the front of the nose plate, wherein the transducer is configured to acquire data indicative of vibration transferred from a nose of the user to the nosepiece during speech by the user.

5. The head-mounted wearable device of claim 4, further comprising a motion limiter between the transducer and the frame bridge, wherein the motion limiter comprises one or more of an elastomeric material, foam, a magnet, or a spring that joins the transducer to the front frame, and wherein the motion limiter attenuates transfer of vibrations between the nosepiece and the front frame.

6. The head-mounted wearable device of claim 4, further comprising a motion limiter between the transducer and the frame bridge, wherein the motion limiter is separated from the transducer by an air gap, and wherein the motion limiter attenuates vibrations between the nosepiece and the front frame.

7. The head-mounted wearable device of claim 4, wherein the transducer comprises an accelerometer to provide output indicative of audio frequency vibrations during user speech.

8. The head-mounted wearable device of claim 4, wherein the transducer comprises a piezoelectric material.

9. The head-mounted wearable device of claim 4, further comprising a pair of pad arms, wherein each pad arm joins a respective one of the pair of nose pads to the nose plate.

10. The head-mounted wearable device of claim 4, wherein the nose plate and the pair of nose pads comprise a unitary piece.

11. The head-mounted wearable device of claim 4, further comprising:
a flexible printed circuit (FPC) comprising a plurality of electrical conductors that are located at least partially within the front frame and connected to the transducer.

12. The head-mounted wearable device of claim 4, further comprising an analog to digital converter (ADC) device, wherein the ADC device converts analog output from the transducer to a digital signal.

13. A head-mounted wearable device comprising:
a front frame;
a nosepiece comprising:
a lateral member having a back proximate to a user during operation and a front that is opposite the back;
a nosepiece post extending away from the front of the lateral member; and
a pair of nose pads affixed to the lateral member; and
a transducer to acquire data indicative of vibration transferred from a nose of the user to the nosepiece during user speech, wherein the transducer is in front of and in contact with the nosepiece post, and wherein the transducer is mounted to the front frame by a first support post arranged proximate to a first end of the transducer and a second support post arranged proximate to a second end of the transducer.

14. The head-mounted wearable device of claim 13, further comprising:
one or more support arches extending from the nosepiece to the front frame, wherein the one or more support arches allow the nosepiece to move relative to the front frame.

15. The head-mounted wearable device of claim 13, wherein one or more of the first support post or the second support post comprises one or more of an elastomeric material or a spring.

16. The head-mounted wearable device of claim 13, wherein the transducer comprises an accelerometer.

17. The head-mounted wearable device of claim 13, wherein the transducer comprises a piezoelectric material.

18. The head-mounted wearable device of claim 13, further comprising a pair of pad arms, wherein each pad arm joins a respective one of the pair of nose pads to the lateral member.

19. The head-mounted wearable device of claim 13, wherein the lateral member and the pair of nose pads comprise a unitary piece.

20. The head-mounted wearable device of claim 13, further comprising:
a flexible printed circuit (FPC) comprising a plurality of electrical conductors that is located at least partially within the front frame and connected to the transducer; and
a motion limiter between the transducer and the front frame, wherein the motion limiter is separated from the transducer by an air gap, and wherein the motion limiter attenuates vibrations between the nosepiece and the front frame during user speech.

21. A head-mounted wearable device comprising:

a nosepiece having a nose plate and affixed to a front frame;

a pair of nose pads affixed to the nose plate; and a transducer affixed between the nose plate and a front frame, wherein the transducer detects a vibration and generates a signal in response to the vibration.

* * * * *